US012689261B2

(12) United States Patent

Souers et al.

(10) Patent No.: US 12,689,261 B2

(45) Date of Patent: Jul. 21, 2026

(54) HYBRID MODULE INCLUDING MOTOR ROTOR CONNECTOR FOR CONNECTING TO A TORQUE CONVERTER

(71) Applicant: Schaeffler Technologies AG & Co. KG, Herzogenaurach (DE)

(72) Inventors: Long Souers, North Canton, OH (US); Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 247 days.

(21) Appl. No.: 18/378,140

(22) Filed: Oct. 9, 2023

(65) Prior Publication Data

US 2025/0119023 A1 Apr. 10, 2025

(51) Int. Cl.
H02K 7/108 (2006.01)
H02K 7/14 (2006.01)
H02K 15/03 (2025.01)

(52) U.S. Cl.
CPC .............. H02K 7/108 (2013.01); H02K 7/14 (2013.01); H02K 15/03 (2013.01)

(58) Field of Classification Search
CPC ........ H02K 7/108; H02K 7/1085; H02K 7/14; H02K 7/006; H02K 23/68; H02K 27/30; Y02T 10/62

USPC .......................................................... 310/78
See application file for complete search history.

(56) References Cited

U.S. PATENT DOCUMENTS

| | | | | |
|---|---|---|---|---|
| 2006/0289209 A1* | 12/2006 | Grosspietsch | .......... | B60L 50/16 |
| | | | | 180/65.25 |
| 2017/0136869 A1* | 5/2017 | Ziefle | ........................ | B60K 6/48 |
| 2020/0040976 A1* | 2/2020 | Steiner | .................... | B60K 6/405 |
| 2020/0052536 A1* | 2/2020 | Ubelhart | .................. | B60K 6/48 |
| 2021/0277958 A1* | 9/2021 | Park | ..................... | F16D 25/0638 |
| 2022/0153121 A1* | 5/2022 | Velthaus | .................. | B60K 6/40 |

* cited by examiner

*Primary Examiner* — Michael Andrews

(74) *Attorney, Agent, or Firm* — Davidson Kappel LLC

(57) ABSTRACT

A hybrid module is configured for arrangement in a torque path upstream from a transmission and downstream from an internal combustion engine. The hybrid module includes a hybrid drive unit including an electric motor including a rotor. The rotor includes a rotor carrier carrying magnets. The hybrid module also includes a torque converter including a clutch assembly formed by a front cover, a friction material and a piston. The piston is operable to selectively force the friction material into the front cover. The hybrid module also includes a connector non-rotatably fixing the rotor to the torque converter. The connector is formed as a single piece with the front cover and being received in the rotor carrier such that no portion of the connector protrudes from the front cover toward the piston.

20 Claims, 3 Drawing Sheets

HYBRID MODULE INCLUDING MOTOR ROTOR CONNECTOR FOR CONNECTING TO A TORQUE CONVERTER

TECHNICAL FIELD

The present disclosure relates generally to electric motor rotors and more specifically to electric motor rotors in hybrid modules.

BACKGROUND

In hybrid modules, electric motor rotor carriers are generally riveted to the torque converter front cover. Traditional rivets are inserted into cover and rotor carrier holes.

SUMMARY

These traditional rivets require pre-cut holes, which can result in leakage. When traditional rivets are formed to seal the pre-cut holes, contact of the rivets can impact the sealing. The hybrid module of the prevent disclosure eliminates this contact.

A hybrid module is configured for arrangement in a torque path upstream from a transmission and downstream from an internal combustion engine. The hybrid module includes a hybrid drive unit including an electric motor including a rotor. The rotor includes a rotor carrier carrying magnets. The hybrid module also includes a torque converter including a clutch assembly formed by a front cover, a friction material and a piston. The piston is operable to selectively force the friction material into the front cover. The hybrid module also includes a connector non-rotatably fixing the rotor to the torque converter. The connector is formed as a single piece with the front cover and being received in the rotor carrier such that no portion of the connector protrudes from the front cover toward the piston.

In examples, the connector is positioned such that any contact between the piston and the front cover does not contact the connector.

In examples, the connector is extruded from the front cover and provided in a hole in the rotor carrier, the connector only extending partially through the rotor carrier.

In examples, the rotor carrier includes a cylindrical axially extending section supporting the magnets and a disc shaped radially extending section protruding radially outward from an end of axially extending section, the connector being received in the disc shaped radially extending section.

In examples, the disc shaped radially extending section includes a hole formed therein.

In examples, the hole is a tapered hole and an axis of the tapered hole passes through the front cover and a center of the tapered hole, the tapered hole being defined by a tapered surface inclined with respect to the axis of the tapered hole and extending through the disc shaped radially extending section from a first radially extending surface axially facing the front cover to a second radially extending surface axially facing the magnets.

In examples, the tapered hole has a frustoconical shape.

In examples, the tapered surface is tapered at an angle of between 3 and 10 degrees with respect to the axis of the tapered hole.

In examples, an axis of the hole extends parallel to a center axis of the hybrid module, the axis of the hole passing through the front cover and the hole, the disc shaped radially extending section including a first radially extending surface axially facing the front cover, the hole including an annular surface intersecting the first radially extending surface and being inclined with respect to the axis of the connector.

In examples, the annular surface has a cylindrical shape.

In examples, the hole is a blind hole including a second surface at the end of the annular surface, the second surface intersecting the axis of the hole at a non-perpendicular angle.

In examples, the rotor carrier is formed of a cast metal and the front cover is formed of steel.

A method of manufacturing a hybrid module is also provided. The hybrid module is configured for arrangement in a torque path upstream from a transmission and downstream from an internal combustion engine. The method includes non-rotatably fixing together a hybrid drive unit and a torque converter via a connector. The connector is formed as a single piece with a front cover of the torque converter. The hybrid drive unit includes an electric motor including a rotor including a rotor carrier. The non-rotatably fixing includes inserting the connector into a hole in the rotor carrier, and performing a punching operation to join the connector to the rotor carrier. The connector is formed such that no portion of the connector protrudes from the front cover toward a piston of the torque converter.

In examples, the method further includes casting the rotor carrier to include the hole, and extruding the front cover to form the connector.

In examples, the rotor carrier includes a cylindrical axially extending section supporting magnets of the rotor and a disc shaped radially extending section protruding radially outward from an end of axially extending section.

In examples, the hole is a tapered hole formed in the disc shaped radially extending section and an axis of the tapered hole passes through the front cover and a center of the tapered hole, the tapered hole being defined by a tapered surface inclined with respect to the axis of the connector and extending through the disc shaped radially extending section from a first radially extending surface of the disc shaped radially extending section to a second radially extending surface of the disc shaped radially extending section, the first radially extending surface axially facing the magnets and the second radially extending surface axially facing the front cover, the performing the punching operation including punching the connector to deform the connector into contact with the tapered surface, the connector being entirely between the first radially extending surface of the disc shaped radially extending section and an outside radially extending surface of the front cover, the connector resting flush against the tapered surface.

In examples, the tapered surface is a frustoconical surface.

In examples, contact between the connector and the tapered surface seals the tapered hole to prevent fluid flow through the front cover.

In examples, an axis of the hole extends parallel to a center axis of the hybrid module, the axis of the hole passing through the front cover and the hole, the disc shaped radially extending section including a first radially extending surface axially facing the front cover, the hole including an annular surface intersecting the first radially extending surface and being inclined with respect to the axis of the hole, the performing the punching operation including punching an inside radially extending surface of the front cover to deform the connector into contact with the annular surface, the connector being entirely between the first radially extending surface of the disc shaped radially extending section and an outside radially extending surface of the front cover, the connector resting flush against the annular surface.

In examples, the hole is a blind hole including a second surface at and end of the annular surface, the second surface intersecting the axis of the connector at a non-perpendicular angle, the connector resting flush against the second surface.

BRIEF DESCRIPTION OF THE DRAWINGS

The present disclosure is described below by reference to the following drawings, in which.

DETAILED DESCRIPTION

The present disclosure provides a connector connecting the torque converter and the hybrid module that prevents leakage through the front cover of the torque converter.

Figure 1:
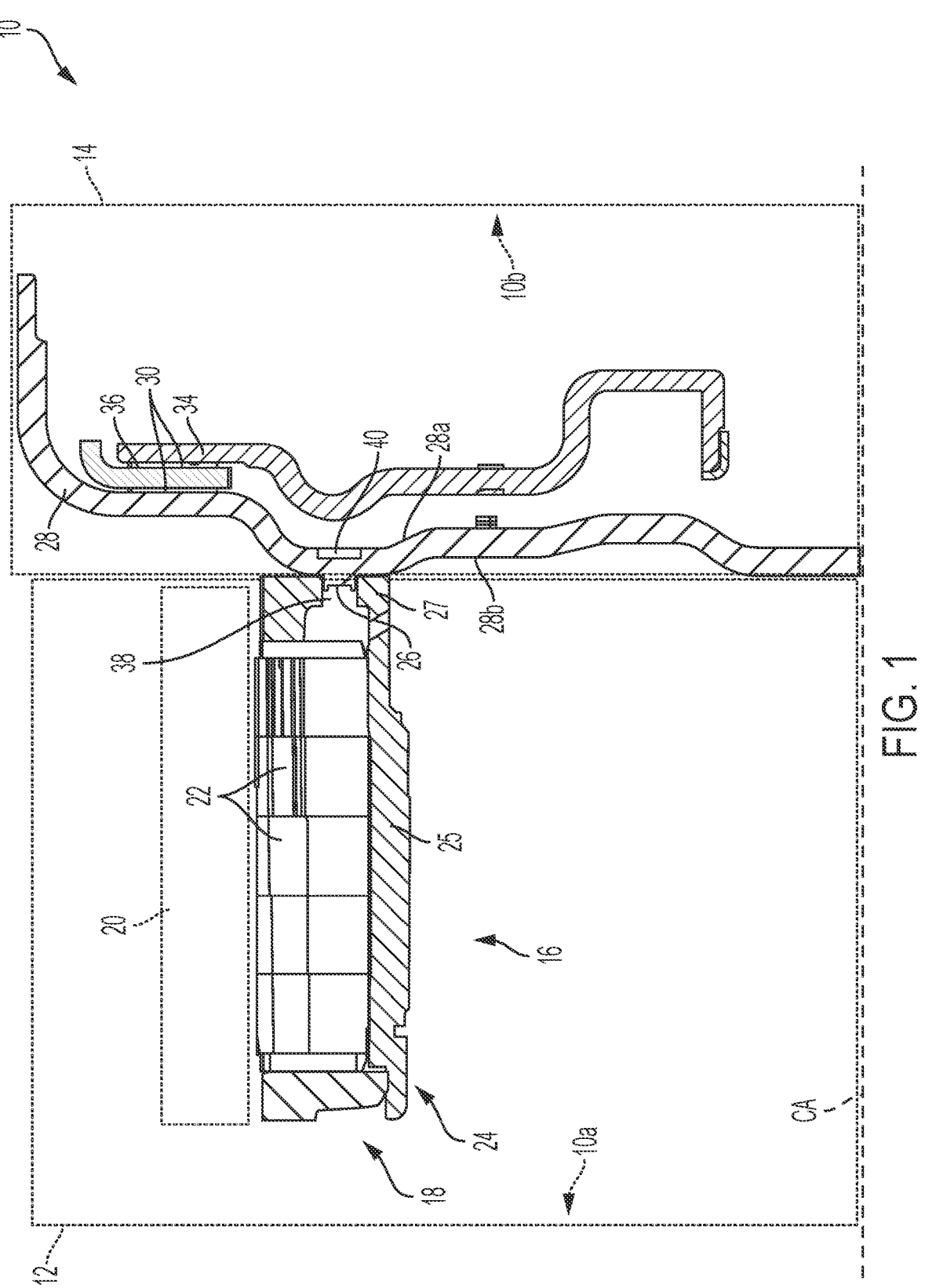
FIG. 1 shows a radially facing cross-sectional view of a hybrid module in accordance with an embodiment of the present disclosure.

FIG. 1 shows portions of a hybrid module 10 in accordance with an embodiment of the present disclosure configured for arrangement in a torque path upstream from a transmission and downstream from an internal combustion engine. Hybrid module 10 includes a hybrid drive unit 12 configured for attachment to the internal combustion engine at a front side 10a of module 10 and a hydrodynamic torque converter 14 configured for attachment to a transmission input shaft of the transmission at a rear side 10b of module 10. In a known manner, hybrid drive unit 12 is selectively operable to transmit torque from the internal combustion engine to torque converter 14 or directly drive torque converter 14 via an electric motor 16 of hybrid drive unit 12. Along these lines, hybrid drive unit 12 includes an engine connect/disconnect clutch for selectively connecting torque converter 14 to an input shaft, which is configured for non-rotatably connecting for example via a flywheel to a crankshaft of the internal combustion engine, or disconnecting torque converter 14 from the input shaft such that torque converter can be driven solely by the electric motor 16.

In a known manner, torque converter 14 also includes a stator axially between a turbine and an impeller to redirect fluid flowing from the turbine blades before the fluid reaches impeller blades to increase the efficiency of torque converter 14.

The electric motor 16 includes a rotor 18, and a stator 20. Upon current being provided to coils of stator 20, rotor 18 is rotated about a center axis CA of hybrid module 10 in a known manner, due to rotor 18 including a plurality of permanent magnets 22 that are energized by the current in the coils. The terms axially, radially and circumferentially as used herein are used with respect to center axis CA, unless otherwise specified. Magnets 22 are supported at their inner circumferences by a rotor carrier 24. Rotor carrier 24 includes a cylindrical axially extending section 25 supporting the inner circumferences of magnets 22 and a disc shaped radially extending section 27 protruding radially outward from an end of axially extending section 25.

Torque converter 14 is non-rotatably fixed to hybrid drive unit 12 by a connector 26 non-rotatably fixing the rotor 18 to the torque converter 14. The connector 26 is formed as a single piece with a front cover 28 of the torque converter 14 and is received in the rotor carrier 24.

Torque converter 14 includes a clutch assembly formed by front cover 28, a friction material 30 and a piston 34. The piston 34 is axially movable to selectively force the friction material 30, which is supported by a clutch plate 36, into the front cover 28. The connector 26 is advantageously formed such that the no portion of the connector 26 protrudes from the front cover 28 toward the piston 34, which advantageously prevents the connector 26 from being damaged by movement of the piston 34. The connector 26 is positioned such that any contact between the piston 34 and the front cover 28 does not contact the connector 26.

As described in further detail below, connector 26 is extruded from the front cover 28 into a hole 38 in the rotor carrier 24 leaving an indentation 40 in a first radially extending surface 28a of the front cover 28—i.e., an outside radially extending surface of the front cover 28 that faces axially away from the rotor carrier 24. Specifically, hole 38 is formed in the disc shaped radially extending section 27, and connector 26 is received in the disc shaped radially extending section 27. In the example of FIG. 1, the hole 38 is a tapered hole. Rotor carrier 24 is formed of a cast metal, for example cast iron, and connector 26 is formed of steel.

In the example of FIG. 1, clutch plate 36 includes friction material 30 on both axial sides thereof. In other embodiments, instead of or in addition to being bonded to clutch plate 36, friction material 30 may be bonded to radially extending axially facing surface of piston 34, or to front cover 28. Regardless of whether friction material 30 is bonded to clutch plate 36, piston 34 or front cover 28, friction material 30 is provided axially between front cover 28 and piston 34 to selectively rotationally engage piston 34 with front cover 28. Torque converter 14 receives torque input from hybrid drive unit 12 through connector 26 at front cover 28, which is transmitted to the impeller. In a known manner, the impeller drives turbine of torque converter 14 via fluid flow from the impeller blades to the turbine blades, when the clutch assembly is disengaged, or via friction material 30, when the clutch assembly is engaged. The turbine then drives the transmission input shaft.

Figure 2A:
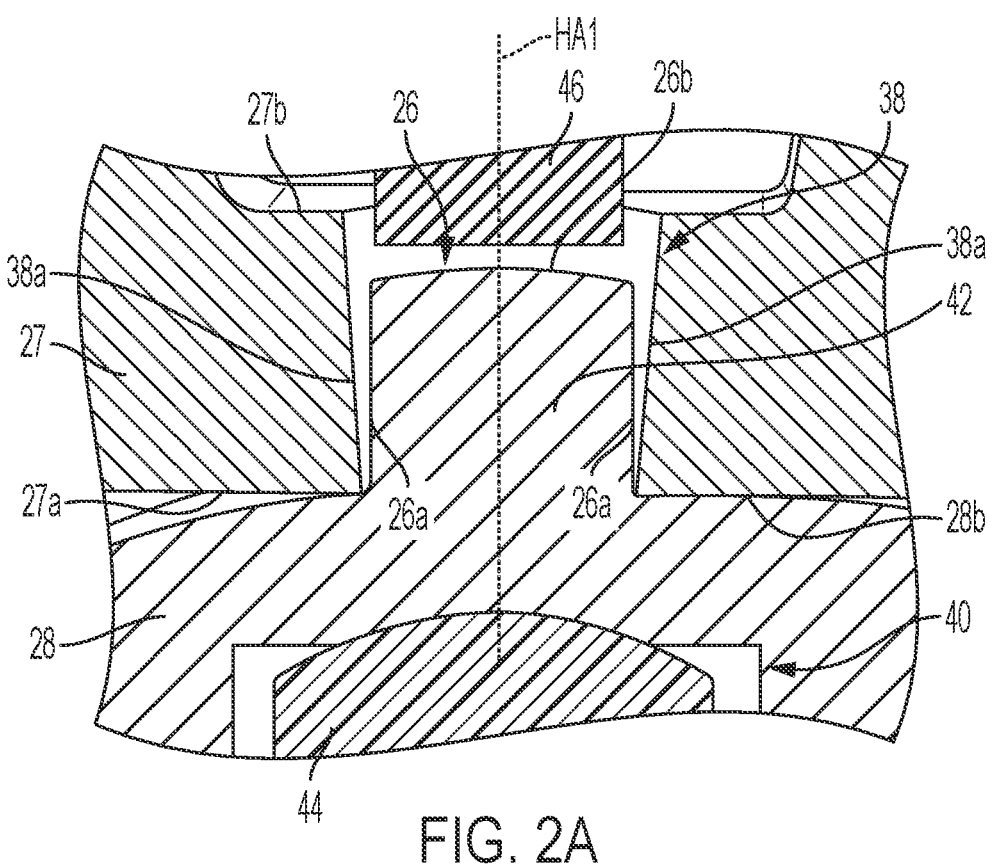
FIGS. 2a, 2b illustrate, from a radially facing cross-sectional view of a disc shaped radially extending section of a rotor carrier, an example of a method of forming a connector connecting the torque converter and hybrid drive unit.
Figure 2B:
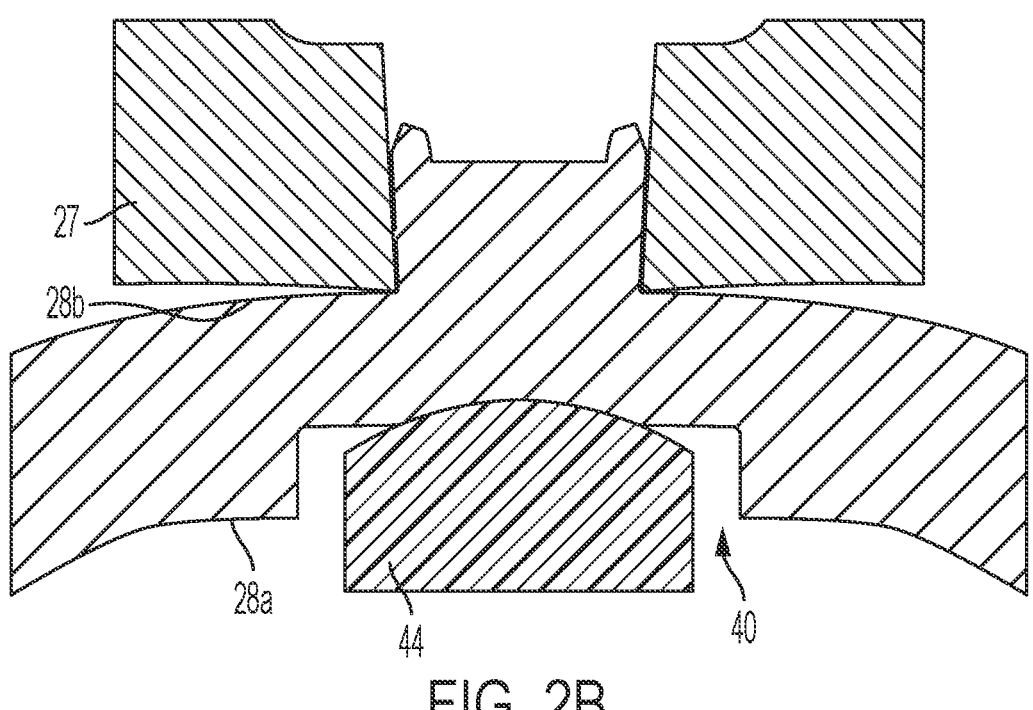

FIGS. 2a, 2b illustrate, from a radially facing cross-sectional view of the disc shaped radially extending section 27 of rotor carrier 24, a method of forming connector 26. The front cover 28 is extruded to form the connector 26 initially in the form of a protrusion 42 protruding from a second radially extending surface 28b of front cover 28—i.e., an outside radially extending surface of the front cover 28, which is opposite of the first radially extending surface 28a, and rotor carrier 24 is cast to form the tapered hole 38, as shown in FIG. 2a.

An axis HA1 of the hole 38 passes through the front cover 28 and a center of the tapered hole 38. The tapered hole 38 is defined by a frustoconical tapered surface 38a inclined with respect to the axis HA1 and extending through the disc shaped radially extending section 27 from a first radially extending surface 27a axially facing the front cover 28 to a second radially extending surface 27b axially facing the magnets 22 (FIG. 1). The tapered surface 38a extends radially away from axis HA1 while extending axially from the first radially extending surface 27a to the second radially extending surface 27b. The tapered surface 38a is tapered at an angle of between 3 and 10 degrees with respect to the axis HA1.

The extruding of front cover 28 leaves an indentation 40 in front cover 28 on the first radially extending surface 28a that faces away from rotor carrier 24. Connector 26, which is formed as a protrusion 42, is then inserted into tapered holes 38 with a second radially extending surface 28b of front cover 28, opposite of the first radially extending surface 28a, contacting a first radially extending surface 27a of radially extending section 27. Tapered surface 38a radially tapers away from side surface 26a of connector 26 in the form of cylindrical protrusion 42 while extending axially from first radially extending surface 28a. After protrusion 42 is inserted into the hole 38, the support tool 44 is forced into indentation 40 and a punching tool 46 is forced into a free end surface 26b of the protrusion 42. Punching tool 46 deforms the free end surface 26b of connector 26 toward front cover 28 and forces side surface 26a into the tapered surface 38a. The punching causes side surface 26a to rest flush against the tapered surface 38a and seals the tapered hole 38 to prevent fluid flow through the front cover 28. The connector 26 only extends partially through the rotor carrier 24, as connector 26 does not extend through surface 27b. In other words, the connector 26 is entirely between the first radially extending surface 27a of the disc shaped radially extending section 27 and the outside radially extending surface 28b of the front cover 28.

Figure 3A:
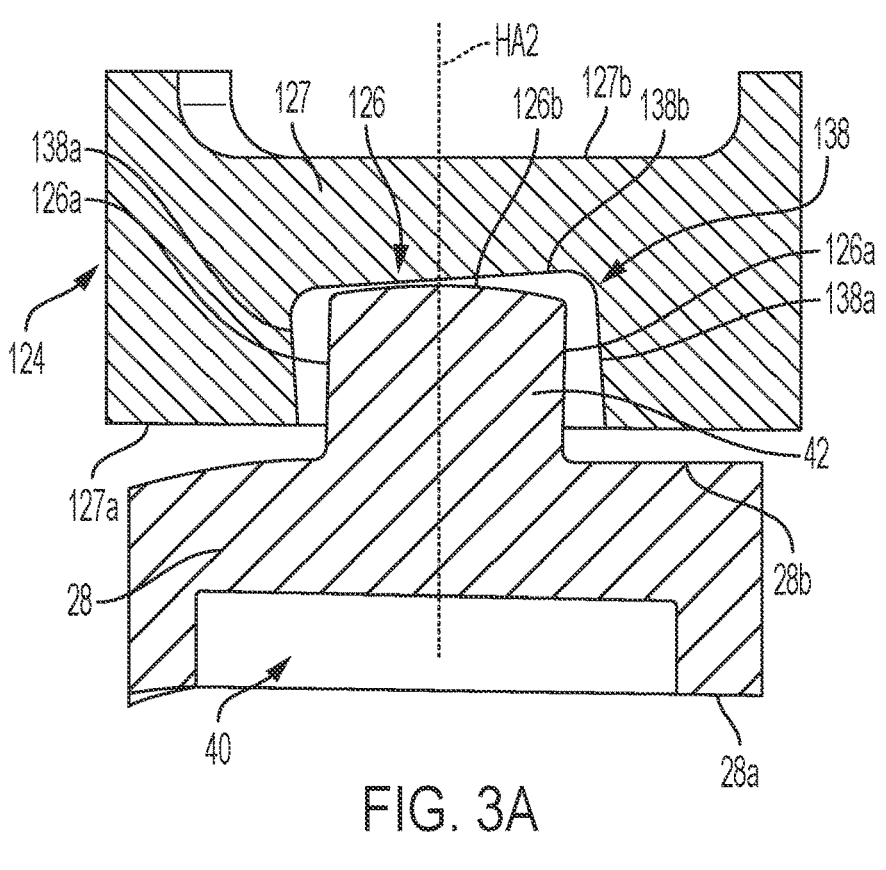
FIGS. 3a, 3b illustrate, from a radially facing cross-sectional view of a disc shaped radially extending section of a rotor carrier, a further example of a method of forming a connector connecting the torque converter and hybrid drive unit.
Figure 3B:
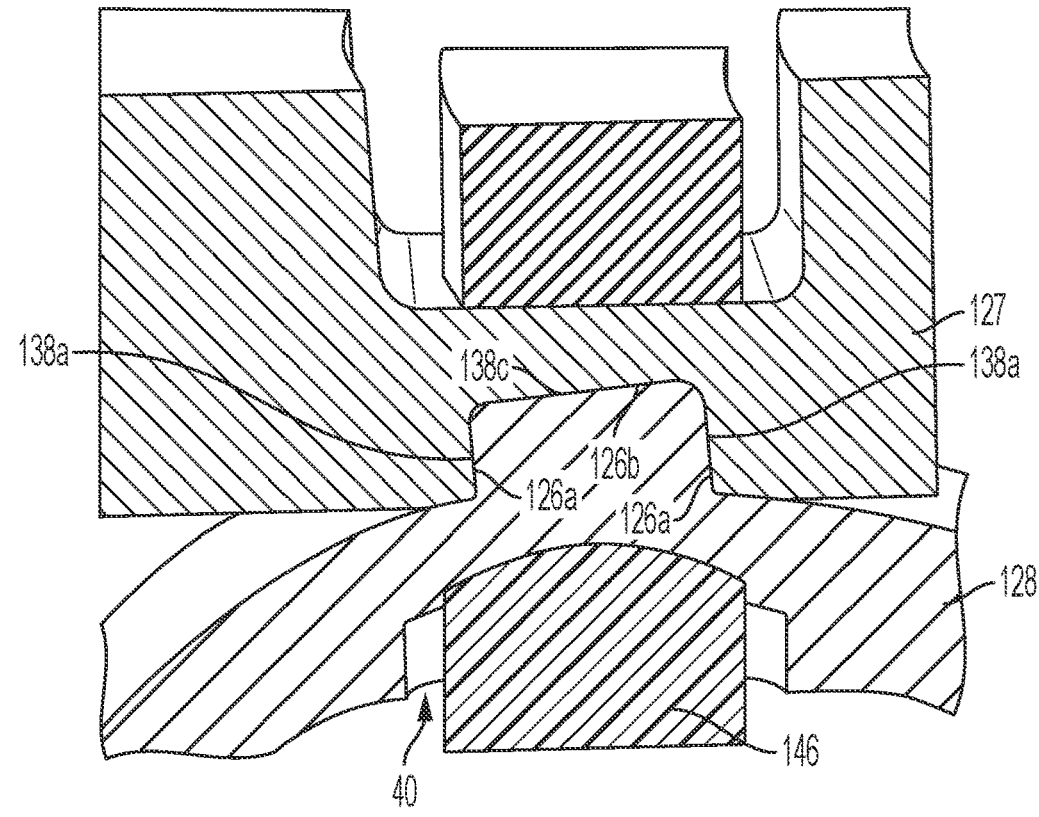

FIGS. 3a, 3b illustrate, from a radially facing cross-sectional view of a disc shaped radially extending section 127 of rotor carrier 124, a method of forming a connector 126 that non-rotatably fixes the rotor 18 to the torque converter 14. Connector 126 is also formed as a single piece with a front cover 28 and is received in a rotor carrier 124 such that the no portion of the connector 126 protrudes from the front cover 28 toward the piston 34 (FIG. 1).

In the same manner as the example of FIGS. 2a, 2b, the front cover 28 is extruded to form the connector 126 initially in the form of a protrusion 42 protruding from a second radially extending surface 28b of front cover 28, which is opposite of the first radially extending surface 28a, and a rotor carrier 124 is cast to form an inclined hole 138 in the disc shaped radially extending section 127 of rotor carrier 124, as shown in FIG. 3a.

An axis HA2 of the hole 138 extends parallel to center axis CA of the hybrid module 10 (FIG. 1) and passes through the front cover 28 and the inclined hole 138. The inclined hole 138 is defined by an annular surface 138a, which has a cylindrical shape, inclined with respect to the axis HA2 and intersecting a first radially extending surface 127a axially facing the front cover 28. The inclined hole 138 is a blind hole further defined by a second surface 138b at the end of surface 138a. The second surface 138b intersects the axis HA2 of the inclined hole 138 at a non-perpendicular angle, and is inclined with respect to the surface 138a. The surface 138a is inclined at an angle of between 3 and 10 degrees with respect to the axis HA2.

Connector 126, as protrusion 42, is then inserted into inclined hole 138 with a free end surface 126b contacting the second surface 138b of the inclined hole 138. Surface 138a is radially inclined with respect to cylindrical side surface 126a of connector 126 in the form of protrusion 42, which is cylindrical, while extending axially from first radially extending surface 28a. After protrusion 42 is inserted into the hole 138, a punching tool 146 is forced into indentation 40. Punching tool 146 deforms indentation 40, which due to rotor carrier 124 being formed of a harder material than front cover 28, causes free end surface 126b to deform into second surface 138b and side surface 126a to deform into surface 138a. The punching causes side surface 126a to rest flush against the surface 138a and forms protrusion 42 into the connector 126 fixed in inclined hole 138 in a manner that non-rotatably fixes rotor carrier 124 to front cover 28. The connector 126 only extends partially through the rotor carrier 124, as connector 126 is prevented from extending through surface 127b by second surface 138b. In other words, the connector 126 is entirely between the first radially extending surface 127a of the disc shaped radially extending section 127 and the outside radially extending surface 28b of the front cover 28.

The shapes of holes 38, 138 allows rotor carriers 24, 124 to be cast, without machining required to form holes 38, 138 and provides a geometry that is sufficiently strong to non-rotatably fixed the torque converter 14 and hybrid drive unit 12 together.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

10 hybrid module
10a front side
10b rear side
12 hybrid drive unit
14 torque converter
16 electric motor
18 rotor
20 stator
22 magnet segments
24 rotor carrier
25 cylindrical axially extending section
26 connector
26a side surface
26b free end surface
27 radially extending section
27a first radially extending surface
27b surface
28 front cover
28a first radially extending surface
28b second radially extending surface
30 friction material
34 piston
36 clutch plate
38 hole
38a tapered surface
40 indentation
42 protrusion
44 support tool
46 punching tool
124 rotor carrier
126 connector
126a cylindrical side surface
126b free end surface
127 section
127a first radially extending surface
127b surface
138 inclined hole
138a surface
138b second surface
146 punching tool

What is claimed is:

1. A hybrid module configured for arrangement in a torque path upstream from a transmission and downstream from an internal combustion engine, the hybrid module comprising:

a hybrid drive unit including an electric motor including a rotor, the rotor including a rotor carrier carrying magnets;

a torque converter including a clutch assembly formed by a front cover, a friction material and a piston, the piston being operable to selectively force the friction material into the front cover; and a connector non-rotatably fixing the rotor to the torque converter, the connector being formed as a single piece with the front cover and being received in the rotor carrier such that no portion of the connector protrudes from the front cover toward the piston, wherein the connector is extruded from the front cover and extends axially into a hole formed in a radially extending surface of the rotor carrier, the connector only extending partially axially through the hole.

2. The hybrid module as recited in claim 1, wherein the connector is positioned such that any contact between the piston and the front cover does not contact the connector.

3. The hybrid module as recited in claim 1, wherein the rotor carrier includes a cylindrical axially extending section supporting the magnets and a disc shaped radially extending section protruding radially outward from an end of axially extending section, the connector being received in the disc shaped radially extending section.

4. The hybrid module as recited in claim 3, wherein the disc shaped radially extending section includes a hole formed therein.

5. The hybrid module as recited in claim 4, wherein the hole is a tapered hole and an axis of the tapered hole passes through the front cover and a center of the tapered hole, the tapered hole being defined by a tapered surface inclined with respect to the axis of the tapered hole and extending through the disc shaped radially extending section from a first radially extending surface axially facing the front cover to a second radially extending surface axially facing the magnets.

6. The hybrid module as recited in claim 5, wherein the tapered hole has a frustoconical shape.

7. The hybrid module as recited in claim 5, wherein the tapered surface is tapered at an angle of between 3 and 10 degrees with respect to the axis of the tapered hole.

8. The hybrid module as recited in claim 4, wherein an axis of the hole extends parallel to a center axis of the hybrid module, the axis of the hole passing through the front cover and the hole, the disc shaped radially extending section including a first radially extending surface axially facing the front cover, the hole including an annular surface intersecting the first radially extending surface and being inclined with respect to the axis of the connector.

9. The hybrid module as recited in claim 8, wherein the annular surface has a cylindrical shape.

10. The hybrid module as recited in claim 9, wherein the hole is a blind hole including a second surface at the end of the annular surface, the second surface intersecting the axis of the hole at a non-perpendicular angle.

11. The hybrid module as recited in claim 1, wherein the rotor carrier is formed of a cast metal and the front cover is formed of steel.

12. A method of manufacturing the hybrid module as recited in claim 1, the method comprising:

non-rotatably fixing together the hybrid drive unit and the torque converter via the connector, the connector being formed as a single piece with the front cover of the torque converter, the non-rotatably fixing including inserting the connector into hole in the rotor carrier, and performing a punching operation to join the connector to the rotor carrier.

13. The method as recited in claim 12, further comprising casting the rotor carrier to include the hole, and extruding the front cover to form the connector.

14. The method as recited in claim 12, wherein the rotor carrier includes a cylindrical axially extending section supporting magnets of the rotor and a disc shaped radially extending section protruding radially outward from an end of axially extending section.

15. A hybrid module configured for arrangement in a torque path upstream from a transmission and downstream from an internal combustion engine, the hybrid module comprising:

a hybrid drive unit including an electric motor including a rotor, the rotor including a rotor carrier carrying magnets;

a torque converter including a clutch assembly formed by a front cover, a friction material and a piston, the piston being operable to selectively force the friction material into the front cover; and a connector non-rotatably fixing the rotor to the torque converter, the connector being formed as a single piece with the front cover and being received in the rotor carrier such that no portion of the connector protrudes from the front cover toward the piston, wherein the rotor carrier includes a cylindrical axially extending section supporting the magnets and a disc shaped radially extending section protruding radially outward from an end of axially extending section, the connector being received in the disc shaped radially extending section.

16. The hybrid module as recited in claim 15, wherein the disc shaped radially extending section includes a hole formed therein.

17. The hybrid module as recited in claim 16, wherein the hole is a tapered hole and an axis of the tapered hole passes through the front cover and a center of the tapered hole, the tapered hole being defined by a tapered surface inclined with respect to the axis of the tapered hole and extending through the disc shaped radially extending section from a first radially extending surface axially facing the front cover to a second radially extending surface axially facing the magnets.

18. The hybrid module as recited in claim 17, wherein the tapered hole has a frustoconical shape.

19. The hybrid module as recited in claim 17, wherein the tapered surface is tapered at an angle of between 3 and 10 degrees with respect to the axis of the tapered hole.

20. The hybrid module as recited in claim 16, wherein an axis of the hole extends parallel to a center axis of the hybrid module, the axis of the hole passing through the front cover and the hole, the disc shaped radially extending section including a first radially extending surface axially facing the front cover, the hole including an annular surface intersecting the first radially extending surface and being inclined with respect to the axis of the connector, wherein the annular surface has a cylindrical shape, wherein the hole is a blind hole including a second surface at the end of the annular surface, the second surface intersecting the axis of the hole at a non-perpendicular angle.

* * * * *